United States Patent Office.

CARL FRIEDRICH CLAUS, OF LONDON, ENGLAND.

MANUFACTURE OF A WHITE PIGMENT.

SPECIFICATION forming part of Letters Patent No. 272,375, dated February 13, 1883.

Application filed September 14, 1881. (No specimens.) Patented in England August 16, 1878, No. 3,246, and August 27, 1881, No. 3,748; in Germany August 9, 1879, No. 6,733, and March 8, 1882, No. 17,399; in France September 15, 1881, No. 144,856, and in Belgium September 19, 1881, No. 55,768.

*To all whom it may concern:*

Be it known that I, CARL FRIEDRICH CLAUS, of London, England, consulting chemist, have invented a new and useful Process for the Manufacture of a White Pigment, and for the simultaneous production of hydrates of alkalies and alkaline earths, (for a portion of which I have obtained a patent in Great Britain, No. 3,246, bearing date August 16, 1878,) of which the following is a specification.

Recently a white pigment has been manufactured, consisting sometimes of precipitated sulphide of zinc and sometimes of mixtures of sulphide of zinc and sulphate of baryta in various proportions. In the first-named case the said pigment is manufactured by precipitation from solutions of sulphate or chloride of zinc by solutions of the sulphides of alkalies, or by precipitation from chloride of zinc by means of the sulphides of alkaline earths, or by precipitation from solutions of oxide of zinc in alkalies by means of sulphide of hydrogen gas. In the second case it is produced by the precipitation from solutions of sulphate of zinc by solutions of sulphide of barium. My present invention affords the means for producing these pigments in a cheaper and more advantageous manner by a process in which I obtain, simultaneously with the said pigment, valuable by-products, whose value nearly equals the cost of production of the pigments. To produce the first-named of these pigments I dissolve oxide of zinc or metallic zinc in caustic potash, caustic soda, or caustic ammonia, (preferably the latter,) and I add to the solution (until a precipitate is no longer formed) a solution of sulphide of potassium, or sulphide of sodium, or sulphide of ammonium, or a solution of sulphide of barium or sulphide of strontium. By this process sulphide of zinc is precipitated, and caustic potash, caustic soda, caustic ammonia, caustic baryta, or caustic strontia is simultaneously formed. A practicable process for the ready and cheap production of caustic baryta and strontia, which has hitherto not existed, is thereby afforded, while the sulphide of zinc is produced with a very slight cost.

By using caustic alkalies (especially caustic ammonia) as a solvent for oxide of zinc I am enabled to use ores which have hitherto been practically valueless by reason of the presence of zinc-blende. The residuum of mixed ores will be more valuable after the removal of the zinc than before, and will pay not only for the zinc furnishing the pigment or color, but for the cost of extraction. Galvanizers' skimmings may also be employed as raw material. The chlorine compounds in the same should be removed by treatment with lime, baryta, or strontia, and the chlorides formed should be washed out by water before dissolving the oxide in ammonia. By using ammonia as the solvent of oxide of zinc derived from such impure raw material, not only do I avoid the dissolving of iron, lead, or other discoloring oxides, except that of copper or silver, but I greatly facilitate the separation of the by-products of caustic alkalies or alkaline earths. The roasted ores are finely ground and placed in a series of extracting or lixiviating closed vats or vessels, and the oxide of zinc is extracted by means of liquid ammonia, which passes from one to the other of the vessels throughout the series of the same. When saturated with oxide of zinc the ammoniacal solution is drawn off from the residuum and allowed to settle clear in closed vessels. If the solution should contain copper or silver, this is first precipitated out by means of solutions of sulphide of barium or sulphide of strontium, and after this precipitate has settled out or is filtered off the oxide of zinc in the clear solution is precipitated by means of solutions of sulphide of strontium or of barium. The precipitation is carried on in a closed vessel, which can be heated by either steam or fire, and from which a pipe carries away the ammonia vapors generated by the heat into a condensing apparatus, where they are condensed into liquid ammonia. When the precipitation is completed and the contents of the vessel have been heated to the boiling-point, the precipitate is filtered off hot, in closed filters, which prevent the escape of ammonia and which can be kept hot.

The filtering may be carried on in press-filters covered over during the filtering process by means of a hood or inverted vessel, like a gasometer, which can be moved up and down on pulleys, and which (when down) fits into a water-lute filled with heavy mineral oil or other suitable liquid to prevent the escape of ammonia. By means of the washing contrivance with which these press-filters are fitted up the press-cakes are washed with hot water to remove most of the ammonia. The washed press-cakes are now heated in muffles or retorts, (closed to prevent the loss of ammonia,) and the ammonia, volatilized by the heat, is conveyed by a pipe attached to the retorts into the condensing apparatus, and is there condensed into liquid ammonia. The heating of the sulphide of zinc press-cakes is continued until the mass has assumed a dull-red heat throughout. When this result has been accomplished the contents of the retorts or muffles are raked out hot into troughs filled with water, and are then ground to an impalpable slime in wet-mills and dried on drying-floors. When dry this product is ready for use as a white pigment, and will be found to have greater body than white lead. The filtrate from the precipitate of sulphide of zinc, which contains most of the ammonia and the whole of the hydrate of baryta or hydrate of strontia, formed during the process of precipitation, is heated in a still or closed boiler until all of the ammonia is volatilized. The ammonia vapor is conveyed by a pipe from the still into a condensing apparatus, where it is condensed into liquid ammonia, which is used again in subsequent operations for dissolving fresh quantities of zinc oxide. The residuum in the still, which contains the hydrate of baryta or strontia, is run hot from the still into crystallizing-vessels, in which it crystallizes out. The mother-liquor may be boiled down again and the remaining baryta or strontia hydrate crystallized out; or the mother-liquor may be used, instead of water, for condensing the ammonia vapors or for washing the precipitate in the press-filter.

Instead of the solutions of sulphide of barium or sulphide of strontium, I may use sulphide of potassium, of sodium, or of ammonium for the precipitation of sulphide of zinc. In this case caustic potash, caustic soda, or caustic ammonia is formed, which can be separated by any of the methods well known to chemists, and I produce, for this purpose, the sulphide of potassium, of sodium, or of ammonium by decomposing sulphate of potash, sulphate of soda, or sulphate of ammonia by means of sulphide-of-barium solutions, whereby at the same time sulphate of baryta is produced.

If caustic-potash or caustic-soda solution has been used for dissolving the oxide of zinc, the distilling operation is unnecessary, and all of the operations can be carried on in open vessels; but the solution in these alkalies will probably contain lead and other metallic oxides, the removal of which would complicate the operations and would render the separation of baryta and strontia hydrates more difficult. I therefore prefer to use ammonia as a solvent.

When it is desired to produce a white pigment consisting of mixtures of sulphide of zinc and sulphate of baryta, I proceed as follows: To the solution of oxide of zinc in caustic alkali (preferably caustic ammonia) I add a solution of sulphate of potash or of soda or of ammonia, and then add a solution of sulphide of barium until a precipitate is no longer formed. Sulphide of zinc is then precipitated, together with sulphate of baryta, in intimate admixture, and simultaneously caustic potash, caustic soda, or caustic ammonia is produced. The precipitate of sulphide of zinc and sulphate of baryta is filtered in a press-filter from the solution of the caustic alkali. It is then calcined in a closed muffle furnace or retort, thrown into water, ground fine, dried, and is then ready for use as a pigment. From the solution of caustic alkali or alkalies the ammonia (if the same or salts of ammonia have been used in the process) is distilled off and condensed, and the caustic potash or soda is further concentrated for commercial use, as well understood by chemists.

As will be seen from the above description, my improved process may be varied or modified to a considerable extent; but What I consider novel and claim as my invention is—

1. The herein-described process of obtaining the hydrates of the alkalies or of the alkaline earths, simultaneously with the precipitation of white sulphide of zinc, by adding to the sulphides of the alkalies or of the alkaline earths solutions of oxide of zinc in caustic alkalies, as specified.

2. The herein-described process of obtaining the hydrates of the alkalies, together with white precipitates of sulphide of zinc and sulphate of baryta, by adding to solutions of sulphide of barium (or sulphide of strontium) solutions of oxide of zinc in caustic alkalies to which sulphate of potash or of soda has been added, as specified.

CARL FRIEDRICH CLAUS.

Witnesses:
JOHN T. KNOWLES,
LEWIS SANDERSON.